(12) United States Patent
Pradel et al.

(10) Patent No.: US 7,074,492 B2
(45) Date of Patent: Jul. 11, 2006

(54) COEXTRUSION TIE BASED ON COGRAFTED METALLACENE POLYETHYLENE AND LLDPE ON SBS AND ON PE

(75) Inventors: Jean-Laurent Pradel, Bernay (FR); Jérome Pascal, Granchain (FR); Patrice Robert, Serquigny (FR)

(73) Assignee: Arkema, Puteaux (FR)

( * ) Notice: Subject to any disclaimer, the term of this patent is extended or adjusted under 35 U.S.C. 154(b) by 122 days.

(21) Appl. No.: 10/662,146

(22) Filed: Sep. 12, 2003

(65) Prior Publication Data
US 2004/0105988 A1 Jun. 3, 2004

(30) Foreign Application Priority Data
Sep. 16, 2002 (FR) ................... 02.11438

(51) Int. Cl.
*B32B 15/085* (2006.01)
*B32B 27/08* (2006.01)
(52) U.S. Cl. .............. 428/457; 428/461; 428/462; 428/474.4; 428/476.3; 428/480; 428/483; 428/500; 428/515; 428/516; 428/517; 428/519; 525/98
(58) Field of Classification Search ............. 428/457, 428/461, 500, 515, 516
See application file for complete search history.

(56) References Cited

U.S. PATENT DOCUMENTS

| 6,528,587 B1 | 3/2003 | Robert et al. ............ 525/191 |
| 6,657,006 B1 * | 12/2003 | Beuzelin et al. ........... 525/71 |
| 2003/0013807 A1 | 1/2003 | Beuzelin et al. ........... 525/65 |

* cited by examiner

*Primary Examiner*—Monique R. Jackson
(74) *Attorney, Agent, or Firm*—Thomas F. Roland

(57) ABSTRACT

The present invention relates to a coextrusion tie comprising 10 to 35 weight % of a polymer (A) itself composed of a blend of 80 to 20 weight % of a metallocene polyethylene (A1) with a density of between 0.865 and 0.915 and of 20 to 80 weight % of a non-metallocene LLDPE polyethylene (A2), the blend of polymers (A1) and (A2) being cografted by an unsaturated carboxylic acid or its derivative, the content of which in the said blend is between 30 and 100 000 ppm; 40 to 60 weight % of a styrene/butadiene/styrene block copolymer (B) with 50 to 90 mol % of styrene; and 20 to 35 weight % of PE (C); the total making 100%, the blend of (A), (B) and (C) being such that the MFI or melt flow index (ASTM D 1238, 190° C., 2.16 kg) is between 0.1 and 10 g/10 min. The present invention also relates to a multilayer structure comprising a layer of tie according to the invention and to the objects comprising such a structure.

9 Claims, No Drawings

US 7,074,492 B2

COEXTRUSION TIE BASED ON COGRAFTED METALLACENE POLYETHYLENE AND LLDPE ON SBS AND ON PE

This application claims benefit, under U.S.C. §119(a) of French National Application Number 02.11438. filed Sep. 16, 2002.

FIELD OF THE INVENTION

The present invention relates to a coextrusion tie based on cografted metallocene polyethylene and linear low density polyethylene (LLDPE), on styrene/butadiene/styrene (SBS) block copolymers with 50 to 90, preferably 60 to 80, mol % of styrene, and on polyethylene (PE), to the multilayer structure comprising this tie and to the objects comprising such a structure.

BACKGROUND OF THE INVENTION

U.S. Pat. No. 6,528,587 of the Applicant Company discloses a composition comprising metallocene PE and non-metallocene LLDPE cografted with unsaturated carboxylic acid diluted in SBS. This document does not relate to multilayer structures comprising a PS layer. To date, coextrusion ties for structures comprising at least one PS layer are ethylene/vinyl acetate copolymers grafted with maleic anhydride.

It has now been found that, within a given range of amount of styrene in the SBS block copolymer, a coextrusion tie is obtained which makes it possible to efficiently tie PS layers to layers, for example, of PE, polyamide (PA) and saponified copolymers of ethylene and vinyl acetate (EVOH), whereas this is not the case outside this range.

This tie thus makes possible the preparation of various structures comprising, inter alia, a layer of polystyrene (PS) with good adhesion values, and has the advantage of exhibiting good heat resistance contributed by the styrene part of the composition. This is a noticeable advantage during the preparation of the structure or of an object produced using the structure with heat sealings or during pasteurization, for example. Another advantage of the ties of the present invention relates to their manufacture. These ties are prepared by melt blending and generally by melt grafting. The tie is recovered in the form of granules at the outlet of an extruder or of any other equivalent device. The Applicant Company has found that this granulation is much easier than for grafted ties of ethylene/vinyl acetate type.

SUMMARY OF THE INVENTION

A subject-matter of the invention is a coextrusion tie comprising:

10 to 35 weight % of a polymer (A) itself comprising a blend of 80 to 20 weight % of a metallocene polyethylene (A1) with a density of between 0.865 and 0.915 and of 20 to 80 weight % of a non-metallocene LLDPE polyethylene (A2), the blend of polymers (A1) and (A2) being cografted by a grafting monomer chosen from unsaturated carboxylic acids and their derivatives, the content of the grafting monomer in the said blend being comprised between 30 and 100 000 ppm;

40 to 60 weight % of a styrene/butadiene/styrene block copolymer (B) with 50 to 90 mol % of styrene,
20 to 35 weight % of PE (C);

the total making 100%, the blend of (A), (B) and (C) being such that the MFI or melt flow index (ASTM D 1238, 190° C., 2.16 kg) is comprised between 0.1 and 10 g/10 min.

According to one embodiment, the tie is characterized in that the density of (A2) is between 0.900 and 0.950.

According to one embodiment, the tie is characterized in that the proportion of grafting monomer in the blend of polymers (A1) and (A2) is between 600 and 5,000 ppm.

According to one embodiment, the tie is characterized in that the grafting monomer is maleic anhydride.

According to one embodiment, the tie is characterized in that the PE (C) has a density between 0.870 and 0.935 and is an LLDPE or a metallocene PE.

Another subject-matter of the invention is a multilayer structure, characterized in that it comprises a layer (L) comprising the tie described above and a layer (E) directly attached to one of the two faces of the said layer (L), the said layer (E) being a layer of polystyrene homo- or copolymer.

According to one embodiment, the multilayer structure is characterized in that a layer (F) is directly attached to the second face of the layer (L), the layer (L) being sandwiched between the layers (E) and (F), the said layer (F) being either a layer of polymer chosen from the group of the polyamides, aliphatic polyketones, saponified copolymers of ethylene and of vinyl acetate (EVOH), polyethylenes, polyesters and polystyrenes or a metal layer.

Furthermore, the invention relates to the objects comprising a structure as described above.

The invention will now be described in detail.

DETAILED DESCRIPTION OF THE INVENTION

As regards (A1), the term "metallocene polyethylene" denotes the polymers obtained by copolymerization of ethylene and of α-olefin, such as, for example, propylene, butene, hexene or octene, in the presence of a single-site catalyst generally composed of an atom of a metal which can, for example, be zirconium or titanium and of two cyclic alkyl molecules bonded to the metal. More specifically, the metallocene catalysts are usually composed of two cyclopentadiene rings bonded to the metal. These catalysts are frequently used with aluminoxanes as cocatalysts or activators, preferably methylaluminoxane (MAO). Hafnium can also be used as the metal to which the cyclopentadiene is attached. Other metallocenes can include transition metals from Groups IVA, VA and VIA. Metals from the lanthanide series can also be used.

These metallocene polyethylenes can also be characterized by their ratio $\overline{Mw}/\overline{Mn}<3$ and preferably <2 in which $\overline{Mw}$ and $\overline{Mn}$ respectively denote the weight-average molar mass and the number-average molar mass. The term "metallocene polyethylene" also denotes those having an MFR (Melt Flow Ratio) of less than 6.53 and a ratio $\overline{Mw}/\overline{Mn}$ greater than MFR minus 4.63. MFR denotes the ratio of the $MFI_{10}$ (MFI under a load of 10 kg) to the $MFI_2$ (MFI under a load of 2.16 kg). Other metallocene polyethylenes are defined by an MFR equal to or greater than 6.13 and a ratio $\overline{Mw}/\overline{Mn}$ less than or equal to MFR minus 4.63.

The density of (A1) is advantageously between 0.870 and 0.900.

As regards (A2), the polymer (A2) is a copolymer of ethylene and of an α-olefin of LLDPE (linear low density polyethylene) type and is not metallocene. The α-olefins advantageously have from 3 to 30 carbon atoms.

Examples of α-olefins having 3 to 30 carbon atoms as possible comonomers include, but are not limited to propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-icocene, 1-docecene, 1-tetracocene, 1-hexacocene, 1-octacocene and 1-triacontene. These α-olefins can be used alone or as a mixture of two or of more than two.

The density of (A2) is advantageously between 0.900 and 0.950.

The MFI or melt flow index of (A2) is between 0.1 and 8 g/10 min (190° C., 2.16 kg).

The blend of the polymers (A1) and (A2) is grafted with an unsaturated carboxylic acid, that is to say that the polymers (A1) and (A2) are cografted. It would not be departing from the scope of the invention to use a functional derivative of this acid.

Examples of unsaturated carboxylic acids are those having 2 to 20 carbon atoms, such as acrylic, methacrylic, maleic, fumaric and itaconic acids. The functional derivatives of these acids include but are not limited to, for example, the anhydrides, the ester derivatives, the amide derivatives, the imide derivatives and the metal salts (such as the alkali metal salts) of these unsaturated carboxylic acids.

Unsaturated dicarboxylic acids having 4 to 10 carbon atoms and their functional derivatives, particularly their anhydrides, are particularly preferred grafting monomers.

These grafting monomers include, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and their functional derivatives, and maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2, 3-dicarboxylic and x-methylbicyclo[2.2.1]hept-5-ene-2,2-dicarboxylic anhydrides.

Examples of other grafting monomers include $C_1$–$C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids, such as acrylamide, methacrylamide, maleic monoamide, maleic diamide, maleic N-monoethylamide, maleic N,N-diethylamide, maleic N-monobutylamide, maleic N,N-dibutylamide, furamic monoamide, furamic diamide, furamic N-monoethylamide, fumaric N,N-diethylamide, fumaric N-monobutylamide and furamic N,N-dibutylamide; imide derivatives of unsaturated carboxylic acids, such as maleimide, N-butylmaleimide and N-phenylmaleimide; and metal salts of unsaturated carboxylic acids, such as sodium acrylate, sodium methacrylate, potassium acrylate and potassium methacrylate. Maleic anhydride is preferred.

Various known processes can be used to graft a grafting monomer to the blend of polymers (A1) and (A2). The blend can comprise the additives commonly used during the processing of polyolefins at contents of between 10 ppm and 50,000 ppm, such as antioxidants based on substituted phenolic molecules; agents for protecting from UV radiation; processing aids, such as fatty amides, stearic acid and its salts; fluoropolymers, known as agents for avoiding extrusion defects; amine-based defogging agents; antiblocking agents, such as silica or talc; or masterbatches with dyes and nucleating agents, inter alia.

For example, this can be carried out by heating the polymers (A1) and (A2) at high temperature, approximately 150° to approximately 300° C., in the presence or in the absence of a solvent, with or without radical initiator. Appropriate solvents which can be used in this reaction are benzene, toluene, xylene, chlorobenzene or cumene, inter alia. Appropriate radical initiators which can be used comprise t-butyl hydroperoxide, cumene hydroperoxide, diisopropylbenzene hydroperoxide, di(t-butyl) peroxide, t-butyl cumyl peroxide, dicumyl peroxide, 1,3-bis((t-butylperoxy)isopropyl)benzene, acetyl peroxide, benzoyl peroxide, isobutyryl peroxide, bis(3,5,5-trimethylhexanoyl) peroxide and methyl ethyl ketone peroxide.

In the blend of polymers (A1) and (A2) modified by grafting obtained in the abovementioned way, the amount of the grafting monomer can be appropriately chosen but it is preferably from 0.01 to 10 weight %, preferably from 600 ppm to 5,000 ppm, with respect to the weight of (A1) and (A2) grafted.

The amount of the grafted monomer is determined by quantitative determination of the succinic functional groups by FTIR spectroscopy. The MFI of (A), that is to say of the blend of (A1) and (A2) which have been cografted, is advantageously 0.1 to 10 g/10 min.

With regard to the SBS block copolymer (B), it is a copolymer exhibiting styrene and butadiene blocks with a proportion of styrenes in the copolymer of 50 to 90 weight % and preferably of 60 to 80 weight %.

The polyethylene (C) is a polyethylene homopolymer or copolymer with a monomer chosen from α-olefins, esters of unsaturated carboxylic acids or vinyl esters of saturated carboxylic acids. The α-olefins were defined above with regard to (A2). The esters of unsaturated carboxylic acids are, for example, alkyl (meth)acrylates in which the alkyl has from 1 to 24 carbon atoms. Examples of alkyl acrylates or alkyl methacrylates which can be used are in particular methyl methacrylate, ethyl acrylate, n-butyl acrylate, isobutyl acrylate or 2-ethylhexyl acrylate. The vinyl esters of saturated carboxylic acids are, for example, vinyl acetate or vinyl propionate. The polymer (C) can be an HDPE, LDPE, LLDPE or VLDPE polyethylene or a metallocene.

The polymer (C) can also be a polymer with an elastomeric nature, that is to say that it can be (i) an elastomer within the meaning of ASTM D412, that is to say a material which can be drawn at ambient temperature to twice its width, can be held thus for 5 minutes and then, when it is released, it returns to its initial length to within less than 10%, or (ii) a polymer which does not have exactly these preceding characteristics but which can be drawn and can return substantially to its initial length.

Polymer (C) is advantageously an LLDPE polyethylene or a metallocene PE with a density of between 0.870 and 0.935.

The ties of the invention are useful for multilayer structures, such as, for example, films, sheets, pipes and hollow bodies, such as petrol tanks.

The multilayer structure of the present invention comprises a layer (L) comprising the tie described above and a layer (E) directly attached to a first face of the said layer (L). The layer (E) is a layer of polystyrene homo- or copolymer.

A layer (F) can also be directly attached to the second face of the layer (L), the layer (L) being sandwiched between the layers (E) and (F), the said layer (F) being either a layer of polymer chosen from the group of the polyamides, aliphatic polyketones, saponified copolymers of ethylene and of vinyl acetate (EVOH), polyethylenes, polyesters and polystyrenes or a metal layer.

The multilayer structure can also comprise a layer (L) comprising the tie sandwiched between two layers (F).

The following structures may be listed by way of example, PS denoting polystyrene, PA polyamide, L the tie, PE the polyethylene and EVOH the saponified copolymer of ethylene and of vinyl acetate:

Structures of layer (E)/layer (L)/layer (F) type: PS/L/PE, PS/L/EVOH/L/PS or PS/L/PA;
Structures of layer (E)/layer (L)/layer (F) and layer (F)/layer (L)/layer (F) type: PS/L/PA/L/PE and PS/L/EVOH/L/PE More specifically, the polyamides are synthetic long-chain polyamides having structural units of the amide group in the main chain, such as PA-6, PA-6,6, PA-6, 10, PA-11, PA-6/6,6 and PA-12. The saponified copolymers of ethylene and of vinyl acetate have a degree of saponification of approximately 90 to 100 mol % and are obtainable by saponifying an ethylene/vinyl acetate copolymer having a content of ethylene of approximately 15 to approximately 60 mol %. The polyesters are selected from the group of poly(ethylene terephthalate), poly(butylene terephthalate), poly(ethylene naphthenate) or their blends or aromatic polyesters, such as liquid crystal polymers.

The metal layer can, for example, be a sheet, a thin film or a sheet of a metal, such as aluminium, iron, copper, tin and nickel, or an alloy comprising at least one of these metals as main constituent. The thickness of the thin film or of the sheet can be suitably chosen and it is, for example, from approximately 0.01 to approximately 0.2 mm. It is common practice to degrease the surface of the metal layer before rolling the tie of the invention over it.

The various layers of the structures of the invention can comprise additives, such as fillers, stabilizers, slip agents, antistatic agents or flame retardants.

The structures of the invention can be manufactured by known coextrusion or extrusion blow-moulding processes of the technology of thermoplastics.

EXAMPLES

The tie compositions according to the invention (Ex. 1–4) and the comparatives (Comp. 1–10) are combined in Table 1A, 1B, and 1C below.

The peel strengths F at t0 (time=0) and at t8 (corresponding to 8 days) are combined in Table 2 below. These strengths are measured following peel tests carried out between tie layer (L) and PS layer and between tie layer (L) and EVOH layer. The films used for these tests are coextruded films composed of three layers for Case 1: PS layer/tie layer (L)/PA layer with thicknesses in μm of 75/5/70 respectively, and films composed of 5 layers for Case 2: PS layer/tie layer (L)/EVOH layer/tie layer (L)/PE layer with thicknesses in μm of 20/10/10/10/80 respectively.

These tests were carried out at a temperature T of 25° C. and at a peel rate of 200 mm/min. The PA Ultramid B36FN from BASF, the PS 7240 and the PE 1020FN24 from Atofina and EVOH comprising 38% of ethylene were used to prepare these films. The symbol s corresponds to the standard deviation.

The aim is to demonstrate that the compositions according to Ex. 1 to Ex. 4 make it possible to simultaneously obtain correct adhesion to PS and EVOH.

In the case of Table 3, the peel strengths F at t=0 and t=8 days of a film composed of 5 layers: PS layer/tie layer (L)/EVOH layer/tie layer (L)/PS layer with thicknesses of 50/5/10/5/20 respectively, were measured at the interfaces mentioned in the table.

The aim is to confirm the observations presented above in a structure comprising both PS and EVOH.

TABLE 1A

| Poly. | Characteristic | Example 1 | | Example 2 | | Example 3 | | Example 4*** | |
|---|---|---|---|---|---|---|---|---|---|
| A | Type of PE | mPE | LLDPE | mPE | LLDPE | mPE | LLDPE | mPE | LLDPE |
| | Density (g/cm$^3$) | 0.87 | 0.92 | 0.87 | 0.92 | 0.87 | 0.92 | 0.87 | 0.92 |
| | Comonomer | 1-octene | 1-butene | 1-octene | 1-butene | 1-octene | 1-butene | 1-octene | 1-butene |
| | Composition | 50% | 50% | 50% | 50% | 50% | 50% | 50% | 50% |
| | Degree of grafting | 0.9% | | 0.9% | | 0.9% | | 0.9% | |
| | Grafting monomer | MAH | | MAH | | MAH | | MAH | |
| | MFI (g/10 min) | 0.7 | | 0.7 | | 0.7 | | 0.7 | |

TABLE 1A-continued

| Poly. | Characteristic | Example 1 | Example 2 | Example 3 | Example 4*** |
|---|---|---|---|---|---|
|  | 190° C., 2.16 kg |  |  |  |  |
|  | Proportion A | 25% | 25% | 25% | 15% |
| B | Type of PS | SBS | SBS | SBS | SBS |
|  | Composition | 73% of S | 73% of S | 73% of S | 73% of S |
|  | Density (g/cm³) | 1.01 | 1.01 | 1.01 | 1.01 |
|  | MFI (g/10 min) 190° C., 2.16 kg | 7.5 | 7.5 | 7.5 | 7.5 |
|  | Proportion B | 40% | 40% | 40% | 40% |
| C | Type of PE | LLDPE | LLDPE | mPE | LLDPE |
|  | Comonomer | C4 | C4 | C8 | C4 |
|  | Density (g/cm³) | 0.910 | 0.910 | 0.870 | 0.810 |
|  | MFI (g/10 min) 190° C., 2.16 kg | 6.6 | 3 | 5 | 3 |
|  | Proportion C | 35% | 35% | 35% | 35% |

***Melting point = 119° C. and Vicat point = 75° C.

Polymer A is a cografted polymer of metallocene polyethylene (mPE) and linear low density polyethylene (LLDPE)

TABLE 1B

| Poly. | Characteristic | Comparative 1 | | Comparative 2 | | Comparative 3 | | Comparative 4 |
|---|---|---|---|---|---|---|---|---|
| A | Type of PE | mPE | LLDPE | mPE | LLDPE | mPE | LLDPE | EVA |
|  | Density (g/cm³) | 0.87 | 0.92 | 0.87 | 0.92 | 0.87 | 0.92 | 0.95 |
|  | Comonomer | 1-octene | 1-butene | 1-octene | 1-butene | 1-octene | 1-butene | Vinyl acetate |
|  | Composition | 50% | 50% | 50% | 50% | 50% | 50% | 100% |
|  | Degree of grafting | 0.9% | | 0.9% | | 0.9% | | 0.2% |
|  | Grafting monomer | MAH | | MAH | | MAH | | MAH |
|  | MFI (g/10 min) 190° C., 2.16 kg | 0.7 | | 0.7 | | 0.7 | | 3 |
|  | Proportion A | 30% | | 25% | | 25% | | 50% |
| B | Type of PS | SBS | | SBS | | SBS | | SBS |
|  | Composition | 73% of S | | 40% of S | | 40% of S | | 73% of S |
|  | Density (g/cm³) | 1.01 | | 0.96 | | 0.96 | | 1.01 |
|  | MFI (g/10 min) 190° C., 2.16 kg | 7.5 | | 8.5 | | 8.5 | | 75 |
|  | Proportion B | 40% | | 40% | | 40% | | 50% |
| C | Type of PE | EVA | | LLDPE | | LLDPE | | — |
|  | Comonomer | Vinyl acetate | | C4 | | C8 | | — |
|  | Density (g/cm³) | 0.95 | | 0.910 | | 0.911 | | — |
|  | MFI (g/10 min) 190° C., 2.16 kg | 5 | | 6 | | 3 | | — |
|  | Proportion C | 30% | | 35% | | 35% | | — |

TABLE 1C

| Poly. | Characteristic | Comparative 5 | | Comparative 6 | | Comparative 7 | | Comparative 8 |
|---|---|---|---|---|---|---|---|---|
| A | Type of PE | mPE | LLDPE | mPE | LLDPE | mPE | LLDPE | EVA |
|  | Density (g/cm³) | 0.87 | 0.92 | 0.87 | 0.92 | 0.87 | 0.92 | 0.95 |
|  | Comonomer | 1-octene | 1-butene | 1-octene | 1-butene | 1-octene | 1-butene | Vinyl acetate |
|  | Composition | 50% | 50% | 50% | 50% | 50% | 50% | 100% |
|  | Degree of grafting | 0.9% | | 0.9% | | 0.9% | | 0.2% |
|  | Grafting monomer | MAH | | MAH | | MAH | | MAH |

TABLE 1C-continued

| Poly. | Characteristic | Comparative 5 | Comparative 6 | Comparative 7 | Comparative 8 |
|---|---|---|---|---|---|
| | MFI (g/10 min) 190° C., 2.16 kg | 0.7 | 0.7 | 0.7 | 3 |
| | Proportion A | 50% | 50% | 30% | 100% |
| B | Type of PS | SBS | SBS | PS | — |
| | Composition | 40% of S | 73% of S | 100% of S | — |
| | Density (g/cm$^3$) | 0.96 | 1.01 | 1.04 | — |
| | MFI (g/10 min) 190° C., 2.16 kg | 8.5 | 7.5 | 5 | — |
| | Proportion B | 50% | 50% | 50% | — |
| C | Type of PE | — | — | mPE | — |
| | Comonomer | — | — | C8 | — |
| | Density (g/cm$^3$) | — | — | 0.870 | — |
| | MFI (g/10 min) 190° C., 2.16 kg | — | — | 5 | — |
| | Proportion C | — | — | 20% | — |

***Melting point = 119° C. and Vicat point = 75° C.

TABLE 2

| | Case 1* | | | | Case 2** | | | |
|---|---|---|---|---|---|---|---|---|
| | F at t0 in N/15 mm | s | F at t8 in N/15 mm | s | F at t0 in N/15 mm | s | F at t8 in N/15 mm | s |
| Ex. 1 | 3.4 | 0.1 | 3.2 | 0.3 | 3.4 | 0.3 | 4.2 | — |
| Ex. 2 | 4.7 | 0.2 | 4.4 | 0.2 | 2.9 | 0.1 | 3.6 | — |
| Ex. 3 | 3 | 0.2 | 3 | 0.2 | 3 | 0.2 | 4.3 | — |
| Ex. 4*** | 3.4 | 0.1 | 3 | 0.2 | 3 | 0.2 | 3.2 | — |
| Comp. 1 | 1.2 | — | 1 | 0 | 0.3 | 0 | 0 | — |
| Comp. 2 | 0.2 | 0 | 0.1 | 0 | 5.4 | 0.1 | 8.2 | — |
| Comp. 3 | 0.3 | 0.1 | 0.1 | 0 | 5 | 0.1 | 6.6 | — |
| Comp. 4 | 6 | 0.8 | 4.3 | 0.5 | 0.4 | 0.2 | 2 | 0.1 |
| Comp. 5 | 2 | 0.2 | 1.9 | 0.3 | 6.1 | 0.6 | 6.7 | 0.3 |
| Comp. 6 | 9.1 | 1 | 7.1 | 2.2 | 2 | 0.1 | 2.4 | 0.1 |
| Comp. 8 | 0.6 | — | 0 | 0 | 0.5 | 0 | 0 | — |
| Comp. 10 | 2.8 | 0.1 | 2.0 | 0.1 | 3.4 | 0.1 | 4.0 | 0.1 |

*failure between the PS layer and the tie layer (L) except for Comp. 1, failure between the PA layer and the tie layer (L)
**peel test carried out between the 80 µm PE layer and the tie layer (L)
***melting point = 119° C. and Vicat point = 75° C.

TABLE 3

| | F at t0 in N/15 mm | s | F at t8 in N/15 mm | s | Interface |
|---|---|---|---|---|---|
| Ex. 1 | 2.3 | 0.4 | 2.5 | 0.4 | L/PS |
| Ex. 2 | 3.3 | 0.2 | 5.2 | 0.2 | L/EVOH |
| Ex. 2 | 3.6 | 0.1 | 3.3 | 0 | L/PS |
| Ex. 3 | 3 | 0.1 | 3.3 | 0.2 | L/PS |
| Ex. 4*** | 1.9 | 0.1 | 2.6 | 0.1 | L/EVOH |
| Comp. 10 | 1.6 | 0 | 1.5 | 0 | L/PS |

***melting point = 119° C. and Vicat point = 75° C.

What is claimed is:

1. A coextrusion tie composition comprising:
   10 to 35 weight % of a polymer (A) comprising a blend of 80 to 20 weight % of a metallocene polyethylene (A1) with a density of between 0.865 g/cm$^3$ and 0.915 g/cm$^3$ and of 20 to 80 weight % of a non-metallocene linear low density polyethylene (LLDPE) (A2), the blend of polymers (A1) and (A2) being cografted by a grafting monomer selected from unsaturated carboxylic acids and their derivatives, said blend comprising between 30 and 100,000 ppm of said grafting monomer;
   40 to 60 weight % of a styrene/butadiene/styrene block copolymer (B) with 50 to 90 mol % of styrene,
   20 to 35 weight % of PE (C);
   the total of (A), (B), and (C) making 100%, the blend of (A), (B) and (C) being such that the MFI or melt flow index (ASTM D 1238, 190° C., 2.16 kg) is between 0.1 and 10 g/10 mm.

2. The tie composition according to claim 1, wherein the density of (A2) is between 0.900 g/cm$^3$ and 0.950 g/cm$^3$.

3. The tie composition according to claim 1, wherein the blend of polymers (A1) and (A2) comprises between 600 and 5 000 ppm of said grafting monomer.

4. The tie composition according to claim 1, wherein the grafting monomer is maleic anhydride.

5. The tie composition according to claim 1, wherein the PE (C) has a density of between 0.870 g/cm$^3$ and 0.935 g/cm$^3$.

6. The tie composition according to claim 1 wherein the PE (C) comprises an LLDPE or a metallocene PE.

7. A multilayer structure, comprising a layer (L) comprising the coextrusion tie composition of claim 1 and a layer (E) directly attached to one of the two faces of said layer (L), said layer (E) being a layer of polystyrene homo- or copolymer.

8. The multilayer structure according to claim 7, wherein a layer (F) is directly attached to the second face of the layer (L), the layer (L) being sandwiched between the layers (E) and (F), the said layer (F) being either a layer of polymer selected from the group consisting of polyamides, aliphatic polyketones, saponified copolymers of ethylene and of vinyl acetate (EVOH), polyethylenes, polyesters and polystyrenes, or a metal layer.

9. An object comprising a multilayer structure according to claim 7.

* * * * *